Nov. 15, 1949  E. L. J. JADOUL  2,488,295
ELASTIC GUIDE FOR CREAM SEPARATOR SHAFTS
Filed March 8, 1946  3 Sheets-Sheet 1
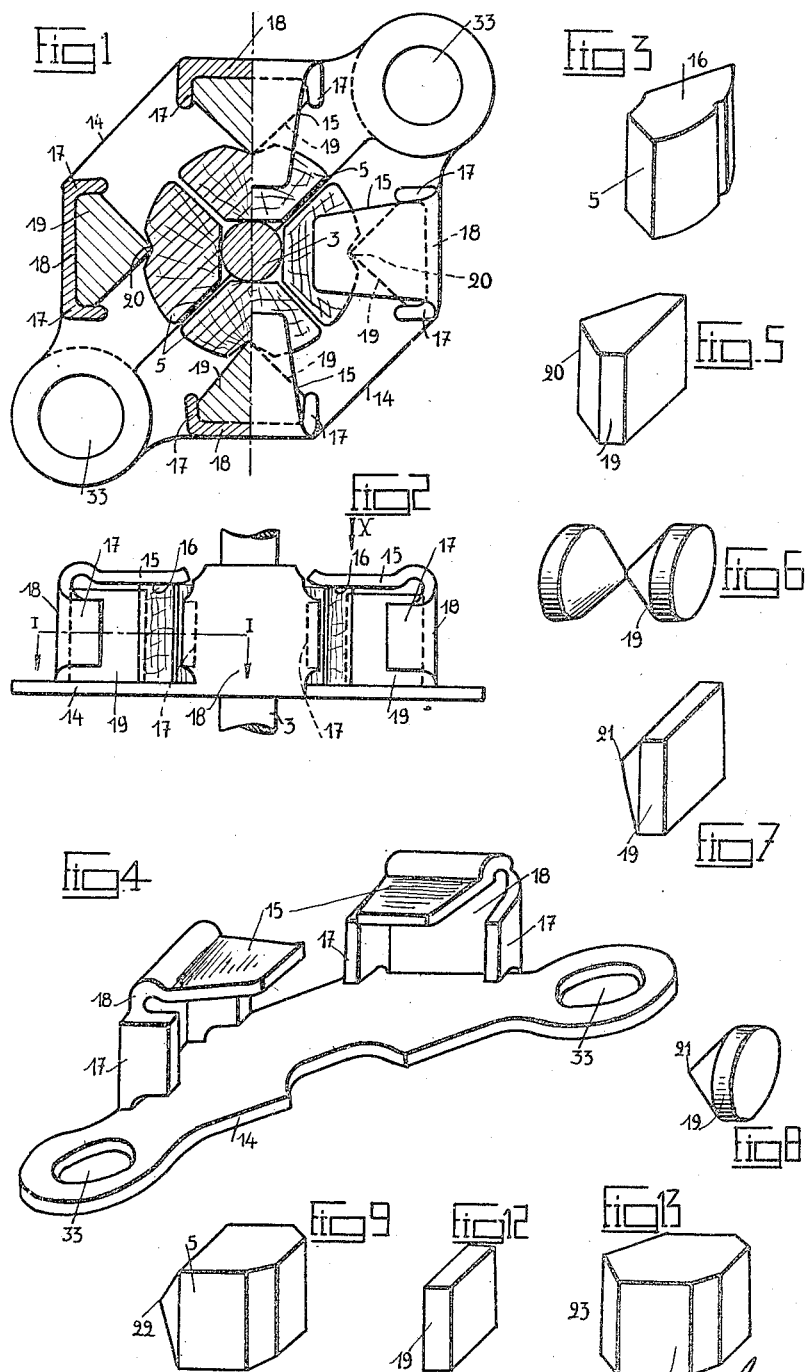

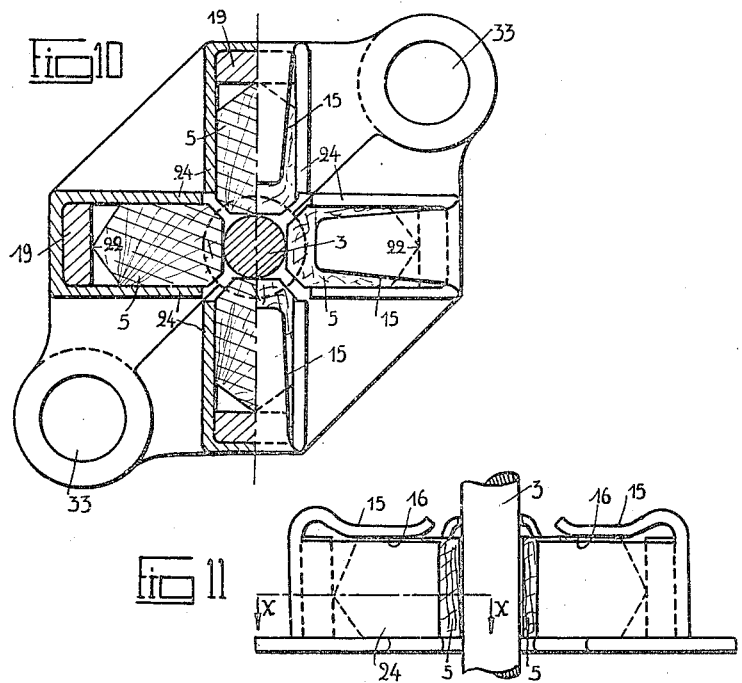
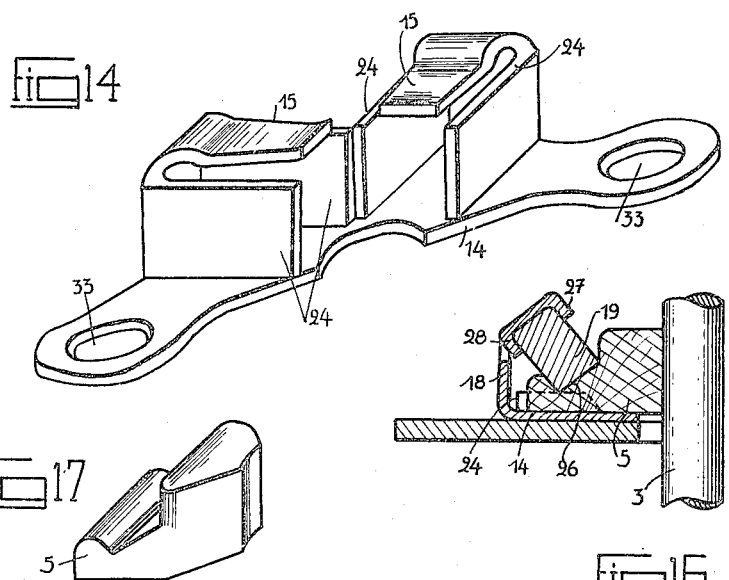

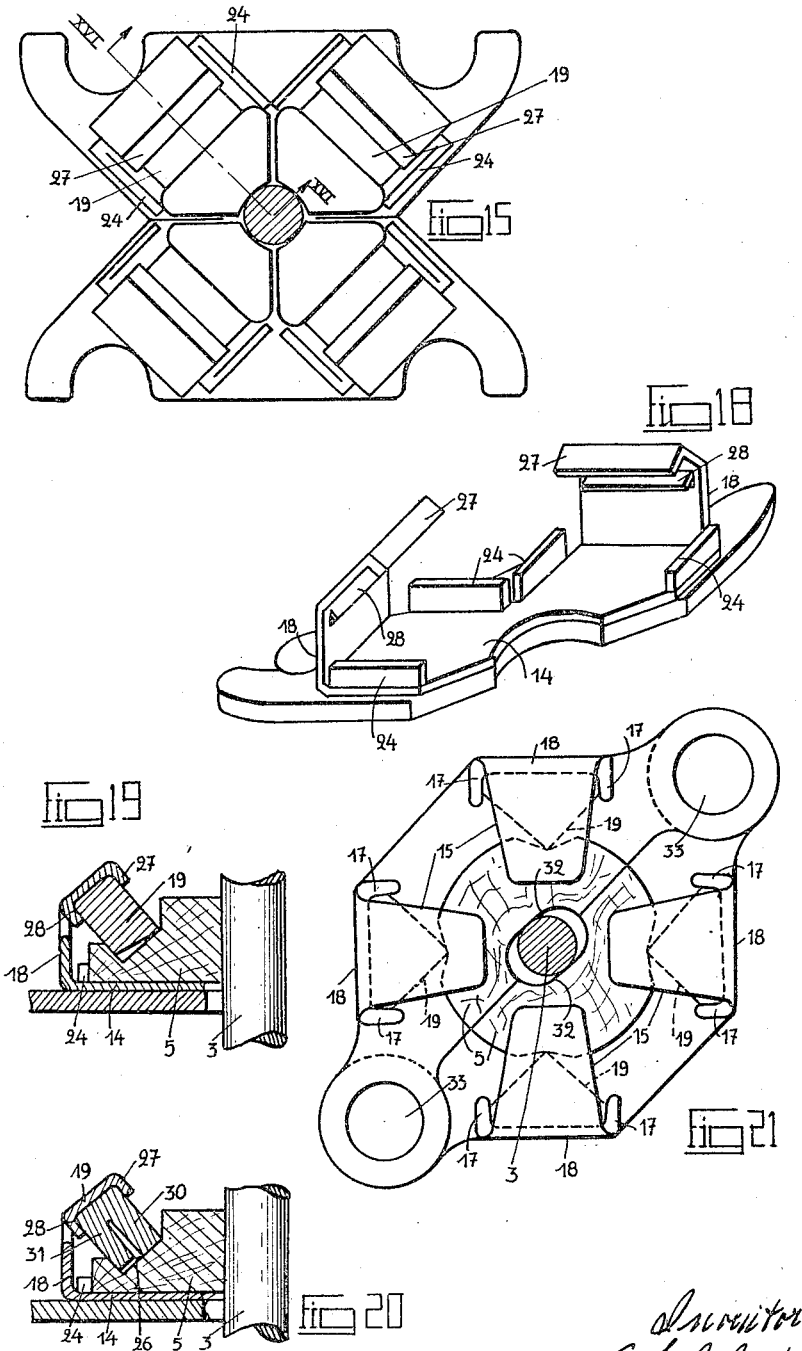

Patented Nov. 15, 1949

2,488,295

UNITED STATES PATENT OFFICE 2,488,295

ELASTIC GUIDE FOR CREAM SEPARATOR SHAFTS

Edmond Léon Jean Jadoul, Brussels, Belgium

Application March 8, 1946, Serial No. 653,208
In Belgium March 13, 1945

18 Claims. (Cl. 308—26)

1

The present invention relates to an elastic guide for the suspension shaft of the bowl of a cream separator wherein this shaft is in contact with a rigid bearing constituted by several elements and surrounded with an elastic cushion, made preferentially from synthetic rubber and acting against the lateral displacements, if any, of the shaft.

In order to avoid that the displacements of the elements of the movable cushion synchronise with the vibrations of the aforesaid shaft, the elastic guide according to the invention comprises members which press the elements of the bearing against a support perpendicular to the axis of the shaft in order to brake the displacements of these elements.

According to an advantageous embodiment, the elastic cushion is constituted by several elements, whereof each preferably corresponds to a single element of the bearing.

The elements of the elastic cushion are, for instance, maintained in position by the support against which the elements of the bearing are being pressed.

In order to ensure a centripetal reaction increasing rapidly when the lateral oscillation of the suspension shaft increases, provision has been made to give the elements of the elastic cushion and the elements of the bearing such surfaces that, in case of a centrifugal displacement of an element of the bearing, the corresponding element of the elastic cushion presents, perpendicularly to the radial direction, a section receiving the pressure which increases as the considered element of the bearing recedes from the axis of suspension of the shaft.

Particularly, each element of the elastic cushion can present a transverse section which is the smaller as it is situated nearer to that part by which it presses on the piece that is in contact therewith. This reduction can lead either to a pointed extremity or to an extremity in form of a knife.

The same conformation can also be given to that part of each element of the bearing which presses against an element of the elastic cushion, and this is also done in order to ensure a centripetal reaction increasing rapidly when the oscillation of the suspension shaft of the bowl increases.

To brake the lateral displacements of the elements of the bearing, it is possible to constitute the support, in contact with which these elements are movable, by a metallic sheet of which certain parts are bent back so as to press elastically on

2 the face of the bearing opposite to that by which the bearing is in contact with the said support.

It is also possible to dispose each element of the elastic cushion in such a way that its axis is directed obliquely on a radial plane in such a direction that the considered element tends to be compressed when the corresponding element of the bearing recedes from the axis of suspension of the aforesaid shaft.

The present invention also relates to an elastic guide for the suspension shaft of the bowl of a cream separator wherein this shaft is in contact with a rigid bearing constituted by several elements and surrounded with an elastic cushion, preferably of synthetic rubber, acting against the lateral displacements of the shaft, if any, and in particular to an elastic guide according to the invention such as it is defined herein before.

According to the invention, the aforesaid support and the elastic cushion are each constituted by at least two parts permitting to effect an easy mounting or dismounting of the properly so called guiding device without it being necessary to mount or dismount the aforesaid shaft.

Other particularities and details of the invention will appear in the course of the description of the accompanying drawings which represent diagrammatically and only by way of example, several embodiments of an elastic guide according to the invention.

Figure 1 is partially a horizontal section on line I—I of Figure 2 and, partially, a plan view of an elastic guide according to the invention.

Figure 2 is a view in elevation of the guide according to Figure 1.

Figure 3 is a perspective view of an element of the bearing employed in the guide according to Figures 1 and 2.

Figure 4 is a perspective view of one of the sheets forming the support for the elements of the bearing of the guide according to Figures 1 and 2.

Figure 5 is a perspective view of an element of the elastic cushion of the guide according to Figures 1 and 2.

Figures 6, 7 and 8 represent modifications of the element according to Figure 5.

Figure 9 is a perspective view of an element of the bearing of the guide according to Figures 10 and 11.

Figure 10 is, partially, a horizontal section on line X—X of Figure 11 and, partially, a plan view of a second guide according to the invention.

Figure 11 is a view in elevation of the guide in accordance with Figure 10.

Figure 12 is a perspective view of an element of the elastic cushion of the guide according to Figures 10 and 11.

Figure 13 is a perspective view of a modification of an element of the bearing of the guide according to Figures 10 and 11.

Figure 14 is a perspective view of one of the sheets which constitute the support of the elements of the bearing of the elastic guide according to Figures 10 and 11.

Figure 15 is a plan view of a third embodiment of an elastic guide in accordance with the invention.

Figure 16 is a vertical section on the line XVI—XVI of Figure 15.

Figure 17 is a perspective view of an element of the bearing of the elastic guide represented in Figures 15 and 16.

Figure 18 is a perspective view of one of the sheets which constitute the support of the elements of the bearing of the elastic guide represented in Figures 15 and 16.

Figures 19 and 20 are sections similar to that of Figure 16 in two modifications of the elastic cushion utilized in Figure 16.

Figure 21 is a plan view of a fourth embodiment of an elastic guide in accordance with the invention.

In these different figures, like reference numerals indicate like parts.

The shaft 3, represented in Figures 1 and 2 and which serves for the suspension of the bowl of a cream separator, is guided in a rigid bearing constituted by a number of wooden elements 5 (Figures 1 and 3) which can stand wear and tear and will not become deformed. As shown in Figure 1, these elements are four in number. They are pressed against a support 14 (Figures 2 and 4), perpendicular to the axis of the shaft 3, by means of spring blades 15 applied on the face 16 of these elements, opposite to that by which the latter are in contact with the support 14. This support is constituted by a metallic sheet which is cut out so as to form a number of tongues. Each spring blade 15 is formed by one of these tongues bent back twice at right angles with regard to the contact surface of the sheet 14 with the elements 5. Other tongues 17, laterally connected to part 18 of the spring blade 15, which is perpendicular to the bearing surface for the elements 5, form with this latter and with the parts 18, cages in each of which is placed an element 19 (Figures 1, 2 and 3) which forms a part of an elastic cushion of synthetic rubber that acts against the lateral displacements, if any, of the shaft. To each bearing element 5 corresponds an element of an elastic cushion 19.

These latter elements are mounted in such a way that they practically exert no tension on the elements 5 of the bearing when the suspension shaft 3 is at rest.

The elements 19 of the elastic cushion present, on one side, an edge 20 by which they are in contact with the corresponding elements 5 of the bearing. Thanks to this fact, when an element 5 of the bearing is centrifugally displaced, the corresponding element 19 of the elastic cushion presents, perpendicularly to the radial direction, a section receiving the pressure which increases as the element of the considered bearing recedes from the suspension axis of the shaft, and that on account of the flattening of the part of the element 19 in contact with the element 5.

In this embodiment, the progressive reaction on the bearing comes from the fact that the elements of the elastic cushion present a transverse section which varies from one section to the other, taken perpendicularly to the radial direction and, particularly, from the fact that one of the extremities of each element 19 presents a transverse section which becomes smaller towards the part by which it presses against the piece in contact therewith. In the represented case, this piece is constituted by an element 5 of the bearing, but it goes without saying that the edge 20 might come into contact with part 18 of support 14.

It is also not necessary that the variation of the aforesaid transverse section should be performed at one of the extremities of each element 19. As will be seen in Figure 6, this variation might be carried out in the median part of this element.

Instead of coming into contact with the adjacent piece by an edge 20, each element 19 might also, as shown in Figure 7, come into contact with this element by a point 21. The shape of the transverse section may be optional. In Figure 7, there is shown an element 19 whereof the transverse section is square, whereas in Figure 8, there is shown another element 19 whereof the transverse section is circular.

The progressive variation of the reaction of the elastic cushion on the bearing, when shaft 3 recedes from its suspension axis, can also be obtained by giving each element of the bearing a transverse section which becomes smaller towards the extremity pressing against the corresponding element of the elastic cushion.

In Figure 9, there is shown an element 5 of this kind, whereof one of the extremities terminates in a point 22 intended to come into contact with an element 19 of the elastic cushion in the way shown in Figures 10 and 11. The element 19 in question is shown more specially in Figure 12.

Instead of terminating in a point, element 5 might also, as shown in Figure 13, terminate in an edge 23 coming into contact with element 19 of the elastic cushion according to Figure 12.

It goes without saying that, in the event of the elements 5 of Figures 9 and 13, only that part of these elements which is intended to come into contact with an element of the elastic cushion, advantageously presents a section which becomes smaller towards the contact zone.

Figures 10 and 11 show that each element 5 of the bearing is laterally guided by lateral flanges 24 (see also Figure 14), integral with support 14 in contact with which the elements 5 are movable.

In the embodiments shown in Figures 1, 2, 4, 10, 11 and 14, each element 5 of the bearing is braked in its lateral displacements by the spring blade 15 which applies it against the support 14. An application of the same kind can be carried out by the corresponding element of the elastic cushion on condition that the axis of this cushion is directed obliquely on a radial plane in such a direction that the considered element tends to be compressed when the corresponding element of the bearing recedes from the suspension axis of the shaft. An arrangement of this kind of the elements 19 of the elastic cushion is shown in Figures 15 and 16.

In Figure 16, it is seen that each element 19 of the elastic cushion is in contact with the corresponding element 5 of the bearing by a bearing surface 26 perpendicular to its axis.

The bearing element then presents itself as shown more specially in Figure 17.

Each of these elements can be moved in contact with a sheet 14 whereof certain tongues are bent back as more especially shown in Figure 18. In this case, each part 18 is bent back so as to form a pair of pliers in which an element 19 of the elastic cushion is maintained in the desired direction. This pair of pliers is formed by an edge 27 and by a lip 28 cut out of part 18 and bent back parallelly to the edge 27.

Each element 19 of the elastic cushion must not necessarily come into contact with the corresponding element 5 of the bearing by its whole end surface. It may, for instance, be in contact with element 5 by a contact edge 29 (Figure 19), perpendicular to the radial direction according to which the element 5 of the bearing is guided by the flanges 24.

In Figure 20, there is shown another way of effecting the support of element 19 of the elastic cushion on element 5 of the bearing.

In that embodiment, each element of the elastic cushion is constituted by two branches 30 and 31, disposed in regard to the bearing surface 26 of the corresponding element 5 of the bearing in such a way that it comes successively in contact with this surface when the element 5 recedes from the suspension axis of the shaft 3.

Figure 20 shows that branch 30 is in contact with surface 26, whereas branch 31 will come into contact with this surface only if the shaft 3 has receded from its suspension axis in the direction of the arrow X.

In Figure 21, there is shown a guide according to the invention wherein the bearing comprises only two elements 5 each extending over 180°, these elements being maintained in contact with each other by four elements 19 of the elastic cushion, each applied at 45° from one of the extremity faces of a bearing element. In this case, two elements of the elastic cushion correspond in consequence to each bearing element.

As it will be seen from the examination of the same figure, each element of the bearing presents towards the suspension shaft a surface whereof the transverse section has a greater radius of curvature than that of the transverse section of the shaft. Besides, the same holds true for the elements 5, whereof there is a question in connection with the preceding embodiments, as can be seen by the examination of Figures 1, 10 and 15.

In Figure 21, the elements of the bearing present two flat parallel surfaces 32, applied against the suspension shaft and terminating in curved surfaces whereof the transverse section has a radius of curvature practically equal to that of the transverse section of shaft 3.

On Figure 10, it can be seen that the face of each element 5 of the bearing in contact with shaft 3 is flat, i. e. that the transverse section of this face has an infinite radius of curvature. At any rate, the interior surface of each bearing element is hollowed out so that it comes into contact with the suspension shaft only by a generatrix of this shaft.

With a bearing like that which is shown in Figure 21, the shaft 3 is in contact with its guide only along two generatrices.

In all the embodiments, the support for the bearing is constituted by two elements 5 of the bearing which are such that they permit to carry out an easy mounting or dismounting of the guiding device properly so called without it being necessary to have recourse to the mounting or dismounting of the shaft 3. These two parts present eyes for the passage of holding pins, especially of such pins that are often employed for placing guiding cords for the bowl.

It must also be noted that in all the embodiments, matters can be arranged in such a way that the reactions on certain elements of the bearing are different from those produced on other elements of the bearing in order to act against the synchronism of the motions of the shaft and of the elements of the bearing. It is, for instance, possible to utilise elements of the cushion or of the bearing whereof the points or the edges have different angles from one element to the other.

It is obvious that the invention is not exclusively limited to the represented embodiments and that a good deal of modifications may be made in the shape, the arrangement and the constitution of certain elements which play a part in its performance, without departures from the scope and the spirit of the present patent, on condition that these modifications are not in contradiction with the object of each of the following claims.

It goes without saying, for example, that support 14, instead of being constituted by sheets, might be constituted by massive parts wherein cavities would be hollowed out for placing the elements of the elastic cushion.

Although the employment of an elastic cushion of synthetic rubber would be preferable, the invention can also be carried out with an elastic cushion of natural rubber or constituted by springs such as coil springs or blade springs.

What I claim is:

1. An elastic guide for the vertical suspension shaft of the bowl of a cream separator comprising several rigid elements independent of each other around said shaft and forming a bearing for the latter, an elastic element corresponding to each bearing element and acting against the displacement of the latter away from the suspension axis if the rotating shaft urges said bearing element in this direction, a fixed support for receiving the reaction of the elastic elements, a fixed support perpendicular to the suspension axis and with which the independent bearing elements are in contact, and means for pressing the bearing elements against said support in order to brake these elements in their lateral displacements, these pressing means being themselves mounted on a fixed support.

2. An elastic guide for the vertical suspension shaft of the bowl of a cream separator comprising several rigid elements independent of each other around said shaft and forming a bearing for the latter, an elastic element corresponding to each bearing element and acting against the displacement of the latter away from the suspension axis if the rotating shaft urges said bearing element in this direction, said elastic elements being however mounted in such a manner as to practically exert no pressure on the corresponding bearing elements when the shaft is at rest, a fixed support for receiving the reaction of the elastic elements, a fixed support perpendicular to the suspension axis and with which the independent bearing elements are in contact, and means for pressing the bearing elements against said support in order to brake these elements in their lateral displacements, these pressing means being themselves mounted on a fixed support.

3. An elastic guide for the vertical suspension shaft of the bowl of a cream separator comprising several rigid elements independent of each other around said shaft and forming a bearing for the latter, an elastic element corresponding to each bearing element and acting against the displacement of the latter away from the suspension axis if the rotating shaft urges said bearing element in this direction, a fixed support perpendicular to the suspension axis and with which the independent bearing elements are in contact, said fixed support being moreover so designed that it can receive the reaction of said elastic elements, and means for pressing the bearing elements against said support in order to brake these elements in their lateral displacements, these pressing means being themselves mounted on a fixed support.

4. An elastic guide for the vertical suspension shaft of the bowl of a cream separator comprising several rigid elements independent of each other around said shaft and forming a bearing for the latter, an elastic element corresponding to each bearing element and acting against the displacement of the latter away from the suspension axis if the rotating shaft urges said bearing element in this direction, a metallic sheet perpendicular to the suspension axis and with which the independent bearing elements are in contact, bent parts of said sheet forming cages in which said elastic elements are placed, and means for pressing the bearing elements against said support in order to brake these elements in their lateral displacements, these pressing means being themselves mounted on a fixed support.

5. An elastic guide for the vertical suspension shaft of the bowl of a cream separator comprising several rigid elements independent of each other around said shaft and forming a bearing for the latter, an elastic element corresponding to each bearing element and acting against the displacement of the latter away from the suspension axis if the rotating shaft urges said bearing element in this direction, the elastic elements and the bearing elements having such surfaces that when a centrifugal displacement of a bearing element takes place, the corresponding elastic element presents, perpendicularly to the radial direction, a section receiving the pressure which increases as the considered elastic element recedes from the suspension axis, a fixed support for receiving the reaction of the elastic elements, a fixed support perpendicular to the suspension axis and with which the independent bearing elements are in contact, and means for pressing the bearing elements against said support in order to brake these elements in their lateral displacements, these pressing means being themselves mounted on a fixed support.

6. An elastic guide for the vertical suspension shaft of the bowl of a cream separator comprising several rigid elements independent of each other around said shaft and forming a bearing for the latter, an elastic element corresponding to each bearing element and acting against the displacement of the latter away from the suspension axis if the rotating shaft urges said bearing element in this direction, each elastic element presenting a transverse section which varies from one section to the other taken perpendicularly to the radial direction, a fixed support for receiving the reaction of the elastic element, a fixed support perpendicular to the suspension axis and with which the independent bearing elements are in contact, and means for pressing the bearing elements against said support in order to brake these elements in their lateral displacements, these pressing means being themselves mounted on a fixed support.

7. An elastic guide for the vertical suspension shaft of the bowl of a cream separator comprising several rigid elements independent of each other around said shaft and forming a bearing for the latter, an elastic element corresponding to each bearing element and acting against the displacement of the latter away from the suspension axis if the rotating shaft urges said bearing element in this direction, at least one of the extremities of each elastic element presenting a transverse section which becomes smaller towards the piece against which it presses, a fixed support for receiving the reaction of the elastic elements, a fixed support perpendicular to the suspension axis and with which the independent bearing elements are in contact, and means for pressing the bearing elements against said support in order to brake these elements in their lateral displacements, these pressing means being themselves mounted on a fixed support.

8. An elastic guide for the vertical suspension shaft of the bowl of a cream separator comprising several rigid elements independent of each other around said shaft and forming a bearing for the latter, an elastic element corresponding to each bearing element and acting against the displacement of the latter away from the suspension axis if the rotating shaft urges said bearing element in this direction, one of the extremities of said elastic elements being in contact with an adjacent piece by an edge, a fixed support for receiving the reaction of the elastic elements, a fixed support perpendicular to the suspension axis and with which the independent bearing elements are in contact, and means for pressing the bearing elements against said support in order to brake these elements in their lateral displacements, these pressing means being themselves mounted on a fixed support.

9. An elastic guide for the vertical suspension shaft of the bowl of a cream separator comprising several rigid elements independent of each other around said shaft and forming a bearing for the latter, an elastic element corresponding to each bearing element and acting against the displacement of the latter away from the suspension axis if the rotating shaft urges said bearing element in this direction, each bearing element presenting a transverse section which becomes smaller towards the extremity pressing against the corresponding elastic element, a fixed support for receiving the reaction of the elastic elements, a fixed support perpendicular to the suspension axis and with which the independent bearing elements are in contact, and means for pressing the bearing elements against said support in order to brake these elements in their lateral displacements, these pressing means being themselves mounted on a fixed support.

10. An elastic guide for the vertical suspension shaft of the bowl of a cream separator comprising several rigid elements independent of each other around said shaft and forming a bearing for the latter, an elastic element corresponding to each bearing element and acting against the displacement of the latter away from the suspension axis if the rotating shaft urges said bearing element in this direction, each bearing element being in contact with the corresponding elastic element by a pointed extremity, a fixed support for receiving the reaction of the elastic elements, a fixed support perpendicular to the suspension axis and with which the independent bearing elements are in contact, and means for pressing the bearing elements against said support in order to brake these elements in their lateral displacements, these pressing means being themselves mounted on a fixed support.

11. An elastic guide for the vertical suspension shaft of the bowl of cream separator comprising several rigid elements independent of each other around said shaft and forming a bearing for the latter, an elastic element corresponding to each bearing element and acting against the displacement of the latter away from the suspension axis if the rotating shaft urges said bearing element in this direction, a fixed support for receiving the reaction of the elastic elements, a fixed support perpendicular to the suspension axis and with which the independent bearing elements are in contact, means for pressing the bearing elements against said support in order to brake these elements in their lateral displacements, these pressing means being themselves mounted on a fixed support, and flanges integral with said support for radially guiding the bearing elements, each bearing element presenting a transverse section which becomes smaller towards the extremity in contact with the corresponding elastic element.

12. An elastic guide for the vertical suspension shaft of the bowl of a cream separator comprising several rigid elements independent of each other around said shaft and forming a bearing for the latter, an elastic element corresponding to each bearing element and acting against the displacement of the latter away from the suspension axis if the rotating shaft urges said bearing element in this direction, a metallic sheet perpendicular to the suspension axis and with which the independent bearing elements are in contact, and bent parts of said sheet pressing elastically the bearing elements on the latter in order to brake these elements in their lateral displacements.

13. An elastic guide for the vertical suspension shaft of the bowl of a cream separator comprising several rigid elements independent of each other around said shaft and forming a bearing for the latter, an elastic element corresponding to each bearing element and acting against the displacement of the latter away from the suspension axis if the rotating shaft urges said bearing element in this direction, a fixed support for receiving the reaction of the elastic elements, and a fixed support perpendicular to the suspension axis and with which the independent bearing elements are in contact, each elastic element having its axis directed obliquely in a radial plane in such a direction that, on the one hand, the considered elastic element tends to be compressed when the corresponding bearing element recedes from the axis of the suspension axis and that, on the other hand, the considered bearing element is simultaneously pressed against the support with which it is in contact.

14. An elastic guide for the vertical suspension shaft of the bowl of a cream separator comprising several rigid elements independent of each other around said shaft and forming a bearing for the latter, an elastic element corresponding to each bearing element and acting against the displacement of the latter away from the suspension axis if the rotating shaft urges said bearing element in this direction, a fixed support for receiving the reaction of the elastic elements, and a fixed support perpendicular to the suspension axis and with which the independent bearing elements are in contact, each elastic element having its axis directed obliquely in a radial plane in such a direction that, on the one hand, the considered elastic element tends to be compressed when the corresponding bearing element recedes from the axis of the suspension axis and that, on the other hand, the considered bearing element is simultaneously pressed against the support with which it is in contact, each elastic element being moreover in contact with the corresponding bearing element by a bearing surface perpendicular to its axis.

15. An elastic guide for the vertical suspension shaft of the bowl of a cream separator comprising several rigid elements independent of each other around said shaft and forming a bearing for the latter and presenting towards the suspension shaft a surface whereof the transverse section has a greater radius of curvature than that of the transverse section of this shaft, an elastic element corresponding to each bearing element and acting against the displacement of the latter away from the suspension axis if the rotating shaft urges said bearing element in this direction, a fixed support for receiving the reaction of the elastic elements, a fixed support perpendicular to the suspension axis and with which the independent bearing elements are in contact, and means for pressing the bearing elements against said support in order to brake these elements in their lateral displacements, these pressing means being themselves mounted on a fixed support.

16. An elastic guide for the vertical suspension shaft of the bowl of a cream separator comprising several rigid elements independent of each other around said shaft and forming a bearing for the latter and presenting their interior surface hollowed out so as to be in contact with the suspension shaft only by a generatrix of this shaft, an elastic element corresponding to each bearing element and acting against the displacement of the latter away from the suspension axis if the rotating shaft urges said bearing element in this direction, a fixed support for receiving the reaction of the elastic elements, a fixed support perpendicular to the suspension axis and with which the independent bearing elements are in contact, and means for pressing the bearing elements against said support in order to brake these elements in their lateral displacements, these pressing means being themselves mounted on a fixed support.

17. An elastic guide for the vertical suspension shaft of the bowl of a cream separator comprising several rigid elements independent of each other around said shaft and forming a bearing for the latter, an elastic element corresponding to each bearing element and acting against the displacement of the latter away from the suspension axis if the rotating shaft urges said bearing element in this direction, a fixed support for receiving the reaction of the elastic elements, a fixed support perpendicular to the suspension axis and with which the independent bearing elements are in contact, and means for pressing the bearing elements against said support in order to brake these elements in their lateral displacements, these pressing means being themselves mounted on a fixed support, said fixed supports being each constituted by at least two parts permitting to carry out an easy mounting and dismounting of the guiding device properly so called without it being necessary to have recourse to the mounting or dismounting of the aforesaid shaft.

18. An elastic guide for the vertical suspension shaft of the bowl of a cream separator comprising several rigid elements independent of each other around said shaft and forming a bearing for the latter, an elastic element corresponding to each bearing element and acting against the displacement of the latter away from the suspension axis if the rotating shaft urges said bearing element in this direction, a fixed support for receiving the reaction of the elastic elements, a fixed support perpendicular to the suspension axis and with which the independent bearing elements are in contact, and means for pressing the bearing elements against said support in order to brake these elements in their lateral displacements, these pressing means being themselves mounted on a fixed support, said fixed supports being each constituted by at least two parts permitting to carry out an easy mounting and dismounting of the guiding device properly so called without it being necessary to have recourse to the mounting or dismounting of the aforesaid shaft, eyes in the parts of said supports, and holding pins passing in said eyes.

EDMOND LÉON JEAN JADOUL.

REFERENCES CITED

The following references are of record in the file of this patent:

UNITED STATES PATENTS

| Number | Name | Date |
|---|---|---|
| 1,235,841 | Rasmussen | Aug. 7, 1917 |
| 1,814,833 | Doran | July 14, 1931 |
| 1,839,094 | Geyer | Dec. 29, 1931 |